Nov. 20, 1923.
H. F. WILLKIE
PROCESS OF RECOVERING GLYCERINE
Filed Sept. 20, 1919
1,474,750
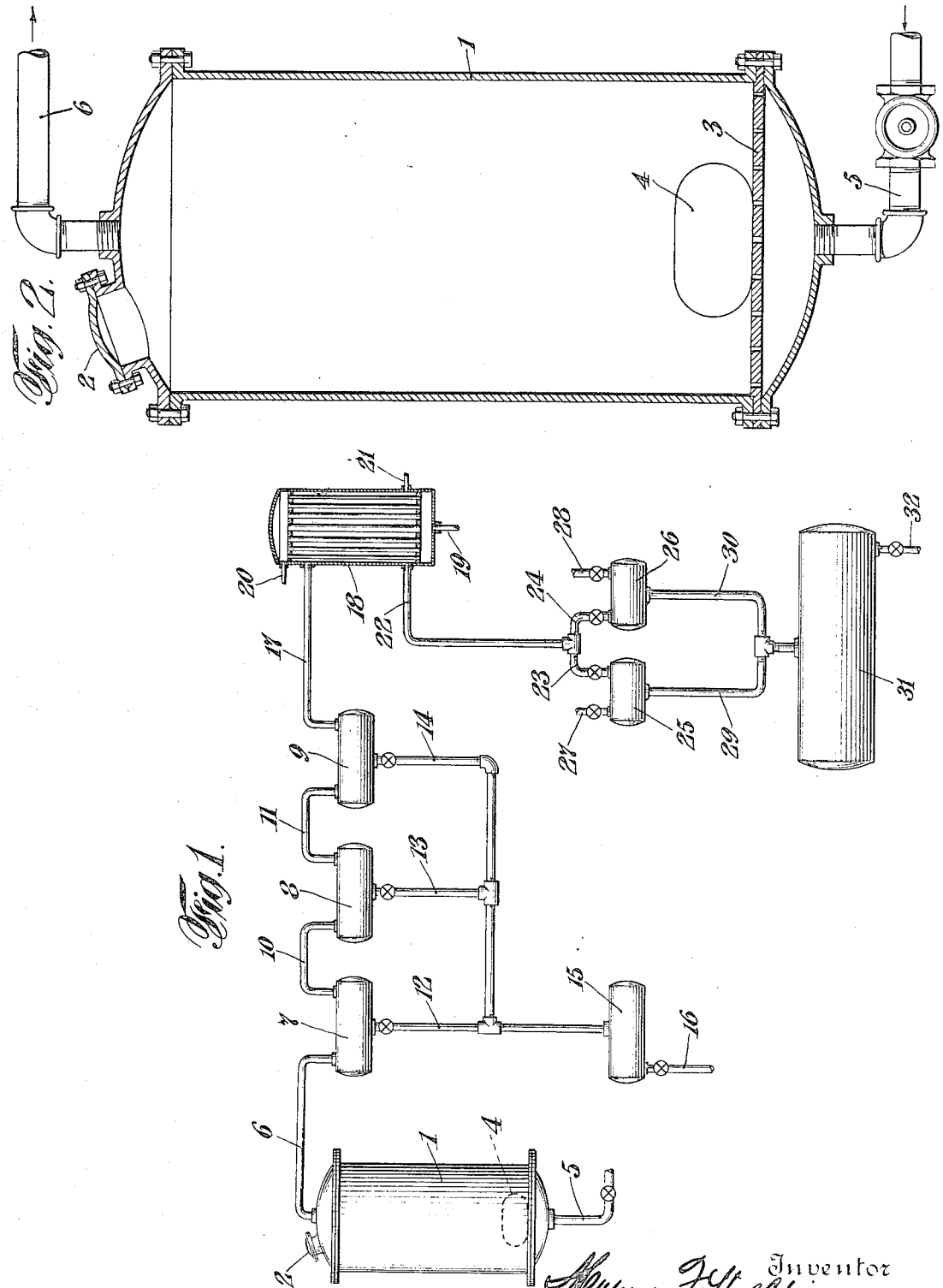

Patented Nov. 20, 1923.

1,474,750

UNITED STATES PATENT OFFICE.

HERMAN F. WILLKIE, OF BALTIMORE, MARYLAND, ASSIGNOR TO U. S. INDUSTRIAL ALCOHOL CO., A CORPORATION OF WEST VIRGINIA.

PROCESS OF RECOVERING GLYCERINE.

Application filed September 20, 1919. Serial No. 325,131.

*To all whom it may concern:*

Be it known that I, HERMAN F. WILLKIE, a citizen of the United States, residing at Baltimore, in the State of Maryland, have invented a certain new and useful Process of Recovering Glycerine, of which the following is a specification.

My invention relates particularly to a process designed to recover glycerine from products of many different kinds but relates particularly to the recovery of glycerine from waste materials obtained in alcohol fermentation.

The object of my invention is to provide a process by means of which glycerine may be recovered from waste materials of many different kinds but particularly from the distillery waste obtained in alcohol fermentation, as for example in the ordinary process of producing alcohol by the fermentation of materials containing sugar or in the alcohol fermentation process using an alkaline medium such as that set forth in the patent to Eoff upon process of manufacturing glycerol, No. 1,288,398, dated December 17, 1918.

Another object of my invention is to provide a process by means of which practically all of the glycerine present in products of this character may be readily separated therefrom.

Further objects of my invention will appear from the detailed description thereof contained hereinafter.

While my invention is capable of being carried out in many different ways I have shown only one way of carrying out the same hereinafter, and while it is capable of being carried out in connection with many different types of apparatus I have shown only one type of apparatus for use in connection therewith in the accompanying drawings, in which—

Fig. 1 is a diagrammatic representation of an apparatus which may be used in connection with my invention; and Fig. 2 is a vertical section of the still contained therein.

For example, in carrying out my invention distillery waste or slop, such for example as that obtained in the ordinary distillation process used for obtaining alcohol, is evaporated in any desired manner, as for example in a multiple effect evaporation apparatus until a product is obtained having a density of 25° to 40° Bé. The condensed product is then changed into a porous solid by drying in any way that will result in the production of such porous solid. For example it may be dried by applying the same to a flexible wire screen web and passing the same through a heated gaseous current, as for example a current of fluid gases having a temperature of 200° C. and then breaking away the dried product from the web and applying further quantities of the condensed product to the web in a similar manner until the entire quantity thereof has been dried. Instead, however, the condensed product may be dried by subjecting the same to vacuum distillation using a vacuum of 20 inches of mercury and a temperature of 80–100° C., thus obtaining a porous solid. Again, instead the drying may be accomplished by blowing superheated steam through the condensed product until the porous solid is obtained. The dried porous product thus obtained may contain approximately 4% of glycerine. This dried product is comminuted to any desired size, as for example a size that will pass through a wire screen having four meshes to the inch. This dried product is then introduced into a still 1 through a charging door 2 where it is received upon a perforated diaphragm 3 located near the bottom of the still adjacent to a discharging door 4. Superheated steam at a temperature of 200° C. is now admitted to the bottom of the still through a pipe 5. The steam is passed through in this manner until all the glycerine has passed out of the still by a vapor outlet pipe 6, the still being maintained during this treatment at a temperature of 175° to 200° C. and under a vacuum of 28–29 inches of mercury for a period of four to five hours. The glycerine thus driven out is collected in a plurality of air cooled condensers 7, 8 and 9, having connecting pipes 10 and 11 and discharge pipes 12, 13 and 14 leading to a storage tank 15 having a valved draw-off pipe 16. The glycerine thus collected will have a strength of from 80 to 90%. The vapors which remain uncondensed in the condenser 9 pass out of the same by a pipe 17 to a water cooled condenser 18 cooled by a current of water supplied with the aid of inlet and outlet pipes 19 and 20. A vacuum is applied to the condenser 18 by means of a pipe 21. The condensate is carried away from the condenser 18 by a pipe 22 and branch pipes 23 and 24 to a plurality of sweet water receivers 25 and 26 having valved vacuum breaking pipes 27 and 28, said receivers 25 and 26 being designed to operate alternately so that the liquid from one or the other of the same may be drawn off when desired by opening one of the vacuum breaking pipes and conducting the liquid by one of the valved draw-off pipes 29 and 30 leading from the receivers 25 and 26 to a sweet water storage tank 31 having a valved draw-off pipe 32. The sweet water obtained from the storage tank 31 and which ordinarily contains from .1% to .5% of glycerine may be recovered in any suitable manner contained therein as by adding the product to the distillery waste and concentrating to the strength of 25% to 40% Bé. hereinabove referred to. This composite distillery waste may then be put through the process as above described.

The glycerine which is obtained from the storage receptacle 15 will be found to contain organic acids as impurities including several percent of succinic acid and in order to remove the same enough caustic lime or caustic soda is added to the glycerine to neutralize the organic acids present thus forming salts of the same after which the glycerine is distilled off from the salts by the aid of a vacuum and superheated steam.

In carrying out the process the removal of the glycerine is rendered feasible by the production of the porous solid which is recovered in the drying operation hereinabove described inasmuch as where the product is porous the superheated steam introduced into the still 1 will have ready access to the various portions of the body of solid being treated. The production of the porous solid, as above described, appears to be dependent upon the presence of constituents which will form a hard structure that will maintain the forms of the bubbles produced in the material when being changed from a liquid to a solid state. These constituents in this material appear to be the mineral matter present comprising principally potassium salts, such for example as potassium chloride, potassium sulfate, potassium succinate, potassium acetate.

While I have described my invention above in detail I wish it to be understood that many changes may be made therein without departing from the spirit thereof.

I claim—

1. The process which comprises recovering glycerine from materials subjected to alcohol fermentation by evaporating water therefrom, then distilling off the glycerine present, condensing the evolved glycerine, subsequently condensing the sweet water vapors, concentrating the sweet water and returning the same to the materials subjected to alcohol fermentation and evaporating and distilling the latter so as to obtain further quantities of glycerine.

2. The process which comprises recovering glycerine from materials subjected to alcohol fermentation by evaporating water therefrom so as to produce a solid mass, then distilling off the glycerine present, condensing the evolved glycerine, subsequently condensing the sweet water vapors, concentrating the sweet water and returning the same to the materials subjected to alcohol fermentation and evaporating and distilling the latter so as to obtain further quantities of glycerine.

3. The process which comprises recovering glycerine from materials subjected to alcohol fermentation by evaporating water therefrom so as to produce a solid porous mass, then distilling off the glycerine present, condensing the evolved glycerine, subsequently condensing the sweet water vapors, concentrating the sweet water and returning the same to the materials subjected to alcohol fermentation and evaporating and distilling the latter so as to obtain further quantities of glycerine.

4. The process which comprises recovering glycerine from materials subjected to alcohol fermentation by evaporating water therefrom so as to produce a solid porous mass containing mineral matter, then distilling off the glycerine present, condensing the evolved glycerine, subsequently condensing the sweet water vapors, concentrating the sweet water and returning the same to the materials subjected to alcohol fermentation and evaporating and distilling the later so as to obtain further quantities of glycerine.

5. The process which comprises recovering glycerine from material subjected to alcohol fermentation by evaporating water therefrom so as to produce a solid porous mass containing salts of potassium, then distilling off the glycerine present, condensing the evolved glycerine, subsequently condensing the sweet water vapors, concentrating the sweet water and returning the same to the materials subjected to alcohol fermentation and evaporating and distilling the latter so as to obtain further quantities of glycerine.

6. The process which comprises recovering glycerine from materials subjected to alcohol fermentation by evaporating water therefrom, then distilling off the impure glycerine present, condensing the evolved glycerine and removing succinic acid therefrom by adding an alkali, and distilling off the pure glycerine from the salts formed.

7. The process which comprises recovering glycerine from materials subjected to alcohol fermentation by evaporating water therefrom so as to produce a solid mass, then distilling off the impure glycerine present, condensing the evolved glycerine and removing succinic acid therefrom by adding an alkali, and distilling off the pure glycerine from the salts formed.

8. The process which comprises recovering glycerine from materials subjected to alcohol fermentation by evaporating water therefrom, then distilling off the impure glycerine present, condensing the evolved glycerine and removing succinic acid therefrom by adding an alkali, and distilling off the pure glycerine from the salt of succinic acid formed.

9. The process which comprises recovering glycerine from materials subjected to alcohol fermentation by evaporating water therefrom so as to produce a solid porous mass, then distilling off the impure glycerine present, condensing the evolved glycerine and removing succinic acid therefrom by adding an alkali, and distilling off the pure glycerine from the salt of succinic acid formed.

10. The process which comprises recovering glycerine from materials subjected to alcohol fermentation by evaporating water therefrom so as to produce a solid porous mass containing mineral matter, then distilling off the glycerine present, condensing the evolved impure glycerine and removing succinic acid therefrom by adding an alkali, and distilling off the pure glycerine from the salt of succinic acid formed.

11. The process which comprises recovering glycerine from materials subjected to alcohol fermentation by evaporating water therefrom so as to produce a solid porous mass containing salts of potassium, then distilling off the impure glycerine present, condensing the evolved glycerine and removing succinic acid therefrom by adding an alkali and distilling off the pure glycerine from the salt of succinic acid formed.

12. The process of recovering glycerine from materials subjected to alcoholic fermentation comprising evaporating said materials to form a dry, porous mass, and distilling off the glycerine present by injecting superheated steam into the mass.

13. The process of recovering glycerine from materials subjected to alcoholic fermentation comprising evaporating said materials to form a dry porous mass, and distilling off the glycerine present by injecting superheated steam at 200° C. into the mass which is maintained under vacuum and at a temperature of about 175° to 200° C.

14. In a process of recovering glycerine from materials subjected to alcoholic fermentation, the steps comprising evaporating water therefrom to produce a porous mass, comminuting the latter, and then distilling off the glycerine present with superheated steam.

15. In a process of recovering glycerine from materials subjected to alcoholic fermentation, the steps comprising evaporating water therefrom to produce a porous mass, comminuting the latter, and then distilling off the glycerine present with superheated steam at 200° C. while the mass is maintained under a vacuum and at about 175° to 200° C.

In testimony that I claim the foregoing, I have hereunto set my hand this 3rd day of September, 1919.

HERMAN F. WILLKIE.